United States Patent
Hoole

(10) Patent No.: US 8,175,603 B1
(45) Date of Patent: May 8, 2012

(54) NEIGHBORING CELL DIRECTED HANDOVER IN A WIRELESS NETWORK

(75) Inventor: Elliott D Hoole, Sammamish, WA (US)

(73) Assignee: Eden Rock Communications, LLC, Bothell, WA (US)

( * ) Notice: Subject to any disclaimer, the term of this patent is extended or adjusted under 35 U.S.C. 154(b) by 242 days.

(21) Appl. No.: 12/421,075

(22) Filed: Apr. 9, 2009

Related U.S. Application Data

(60) Provisional application No. 61/155,107, filed on Feb. 24, 2009.

(51) Int. Cl.
*H04W 36/00* (2009.01)
(52) U.S. Cl. ........ 455/439; 455/436; 455/438; 370/328; 370/338
(58) Field of Classification Search .......... 455/436–444; 370/328, 338
See application file for complete search history.

(56) References Cited

U.S. PATENT DOCUMENTS

| | | | |
|---|---|---|---|
| 2005/0221827 A1* | 10/2005 | Natsume | 455/437 |
| 2007/0213067 A1* | 9/2007 | Li et al. | 455/444 |
| 2008/0064401 A1* | 3/2008 | Forssell et al. | 455/436 |
| 2008/0318576 A1* | 12/2008 | So et al. | 455/436 |

* cited by examiner

*Primary Examiner* — Kamran Afshar
*Assistant Examiner* — Marisol Fahnert

(57) ABSTRACT

A wireless network for addressing the unavailability of airlink connection resources ("resources") is disclosed. A plurality of smaller cells are dynamically created within the coverage boundary of a macrocell, wherein each smaller cell is capable of providing the same resources available from the macrocell. The network further addresses the inefficient "push" schema for handover of services from one node to another. Nodes within each of the plurality of smaller cells continuously scan other nodes to measure resources used by the other nodes for handover using a "pull" schema. The measurement tells a node if it is capable of providing at least a minimum grade of service, and if so, the node informs the subscriber device. If the measurement is mutually valid, the current node initiates the handover to the node. After the handover, the new node continues to provide the at least minimum grade of service.

14 Claims, 7 Drawing Sheets

NEIGHBORING CELL DIRECTED HANDOVER IN A WIRELESS NETWORK

NEIGHBORING CELL DIRECTED HANDOVER
IN A WIRELESS NETWORK

NEIGHBORING CELL DIRECTED HANDOVER IN A WIRELESS NETWORK

NEIGHBORING CELL DIRECTED HANDOVER IN A WIRELESS NETWORK

NEIGHBORING CELL DIRECTED HANDOVER IN A WIRELESS NETWORK

NEIGHBORING CELL DIRECTED HANDOVER IN A WIRELESS NETWORK

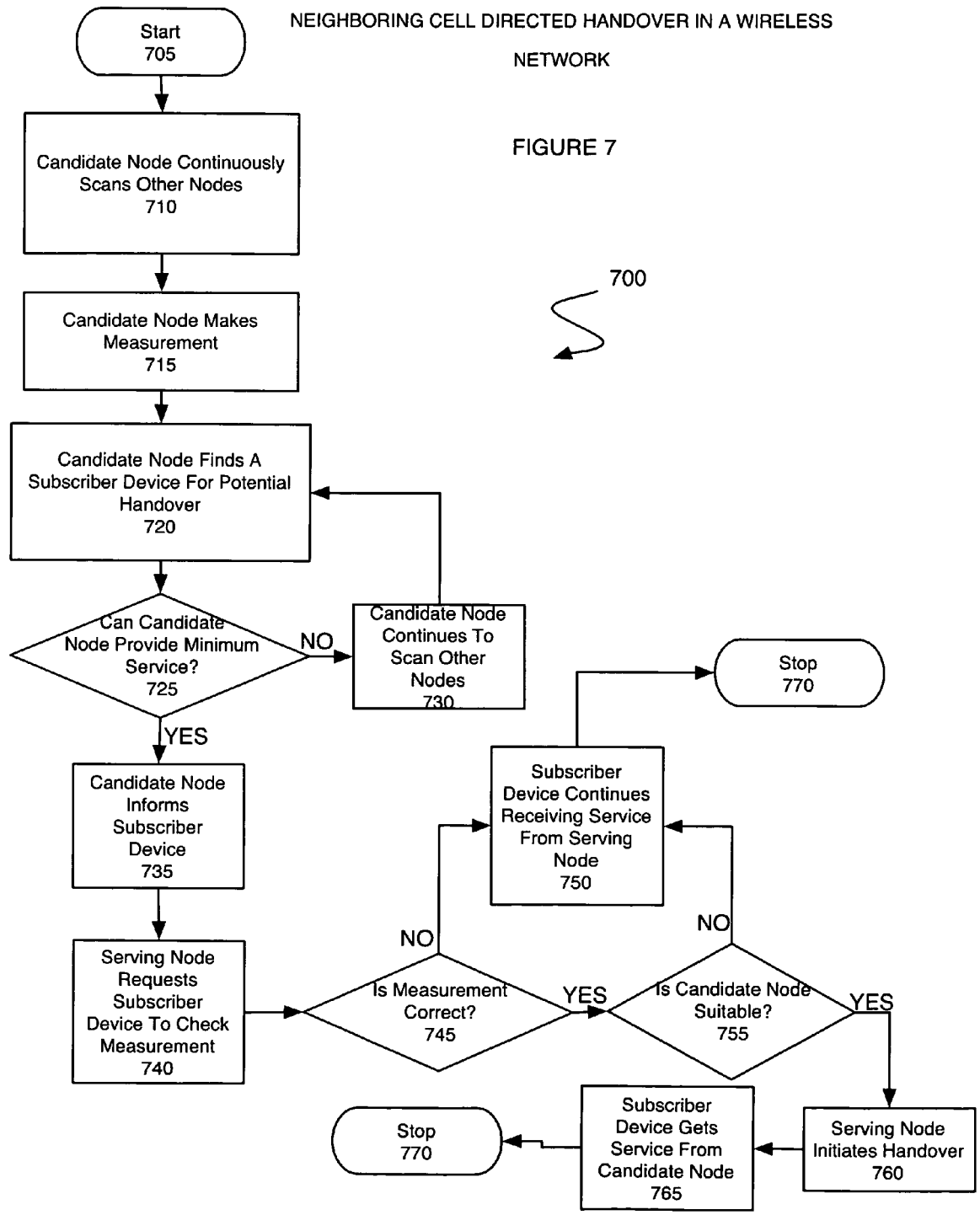

NEIGHBORING CELL DIRECTED HANDOVER IN A WIRELESS NETWORK

CROSS-REFERENCE TO RELATED APPLICATION

This application claims the benefit of U.S. Provisional Patent Application No. 61/155,107, titled "Neighboring Cell Directed Handover In A Wireless Network" filed Feb. 24, 2009, the disclosure of which is hereby expressly incorporated by reference, and the filing date of which is hereby claimed under 35 U.S.C. §119(e).

BACKGROUND

Traditional cellular wireless networks are deployed as a web of macrocells. The web of macrocells is typically laid out in a uniform grid-like formation, wherein each macrocell has a typical coverage radius of perhaps one to five or more kilometers. The uniform grid-like formation ensures that each macrocell has a common coverage boundary with its neighboring macrocells, with a typical maximum of 6 neighboring macrocells. FIG. 1 is a pictorial diagram of an exemplary web of macrocells laid out in a uniform grid-like formation. For example, macrocell P1 shares common coverage boundary B1 with neighboring macrocell P2. Similarly, macrocell P1 shares common coverage boundary B2 with neighboring macrocell P3. Further, macrocell P1 has a maximum of 6 neighboring macrocells, viz. P2-P7.

Since the macrocells are typically laid out in a uniform grid-like formation, wherein each macrocell typically has a cell radius of one to five or more kilometers in radius, which results in a large coverage area, a network consisting of macrocells has a finite bandwidth of frequency resources, time resources, and code resources (collectively "airlink connection resources") available to each of an ever increasing number of subscriber devices including, but not limited to cellular telephones, desktop and laptop personal computers, personal digital assistants (PDAs), and other devices that use wireless technology within the macrocells. As the number of subscriber devices increases, there may be extended periods of time where there are insufficient airlink connection resources available to provide the required levels of service to the increased number of subscriber devices. Unavailability of the finite bandwidth of airlink connection resources is experienced, for example, by cellular telephones "dropping" calls and content of web pages on cellular telephones and computers not downloading completely.

Further, in traditional wireless networks, the subscriber devices within each macrocell are provided with a list of neighboring macrocells for handover of services to a suitable neighboring macrocell using a "push" schema. The "push" schema dictates the subscriber devices to continuously scan resources used by the neighboring macrocells for handover purposes. The network uses the scanned measurements to determine when handover incidents should take place. As is known to one skilled in the art, a handover is the changing of a subscriber device's access connection or airlink connection resources from one radio access node ("node") to another. A handover is typically the result of a mobile subscriber device that leaves the coverage area of one macrocell and enters the coverage area of another. At other times, a handover is done by the network to shift traffic from one macrocell to another if, for instance, one macrocell is more heavily loaded than the other and the subscriber device can receive the required level of service from either. The continuous scanning of neighboring macrocells by subscriber devices for handover purposes also increases the battery drain of the subscriber devices by placing an additional burden on the subscriber devices to process the resources. Furthermore, since macrocells can be added (or deleted) to a coverage area, neighboring macrocells could change. This change results in continually updating the list of macrocells. Continually updating the list and making it available to the subscriber devices is an inefficient schema, especially since the subscriber devices need a complete and correct list in order to "push" services from one macrocell to a suitable other.

Based on the above-described deficiencies associated with traditional wireless networks, there exists a need for a network that addresses the unavailability of the finite bandwidth of airlink connection resources by not only dynamically creating macrocells using an extemporaneous and an "as needed" deployment methodology, but also dynamically creating a plurality of cells smaller in size than macrocells using the same extemporaneous and "as needed" deployment methodology. The plurality of smaller cells are dynamically created within the coverage boundary of each macrocell wherein each smaller cell offers the same bandwidth of airlink connection resources to an ever increasing number of subscriber devices that is available from just the larger macrocells in the traditional wireless networks. There also exists a need for the network to have nodes within the smaller cells to continuously scan resources in use by the other nodes within the same or neighboring cells for handover incidents using a "pull" schema rather than have the subscriber devices continuously scan the resources in use by the neighboring cells for handover incidents using the "push" schema.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A wireless network for addressing the unavailability of finite bandwidth of airlink connection resources experienced by traditional wireless networks is disclosed. The 3GPP Long Term Evolution ("3GPP LTE") wireless network is one such network that addresses the deficiencies associated with the traditional wireless networks. According to one embodiment, the macrocells are not deployed in a uniform grid-like formation, but rather using a dynamic extemporaneous and an "as needed" deployment methodology. According to another embodiment, a plurality of smaller cells is created within the coverage boundary of a macrocell. Each smaller cell within a macrocell is capable of providing to the subscriber devices the same bandwidth of airlink connection resources available from the macrocell. According to another embodiment, each smaller cell is dynamically created to load balance the bandwidth of airlink connection resources due to an increase in the number of subscriber devices or an increase in the resources usage by the subscriber devices.

The wireless network further addresses the prior art inefficient "push" schema for handover of network services of a subscriber device from one node to another. According to one embodiment, nodes within each of the plurality of smaller cells continuously scan subscriber devices actively connected to other nodes for handover of services of a subscriber device using a "pull" schema. According to another embodiment, the nodes are capable of continuously scanning other nodes to measure resources used by the other nodes. The measurement tells the nodes if they are capable of providing to a subscriber device within the same or neighboring cell at least a minimum grade of service required by the wireless network. If a node is capable of providing the at least minimum grade of service, the node informs the node currently serving the subscriber device. According to one embodiment, the node currently providing the airlink connection resources to the subscriber device can request the subscriber device to check if the measurement made by the node requesting the handover is mutually valid. If the measurement is mutually valid, the node currently providing the services to the subscriber device initiates the handover to the requesting node.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 7 is a functional flow chart of an exemplary scenario where a candidate node requests a handover from a serving node currently providing services to a subscriber device, according to one embodiment of the disclosed subject matter.

DETAILED DESCRIPTION

In the following description, numerous specific details are set forth to provide a more thorough description of the illustrative embodiments of the invention. It will be apparent, however, to one skilled in the art that the invention may be practiced without these specific details. In other instances, well known features have not been described in detail so as not to obscure the invention.

Figure 1:
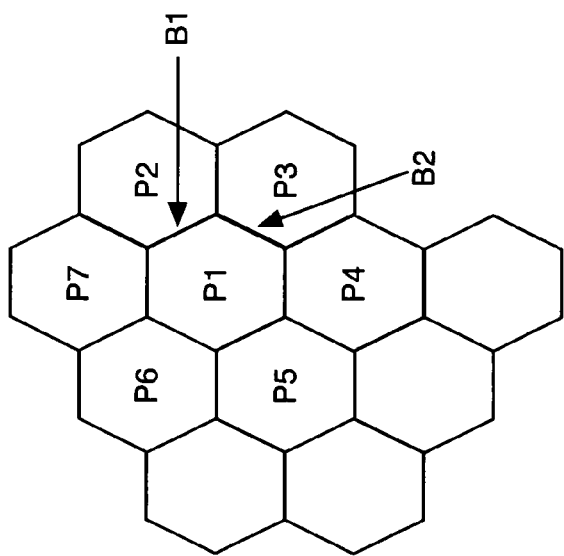
FIG. 1 is a pictorial diagram of an exemplary prior art web of macrocells laid out in a grid formation.
Figure 2:
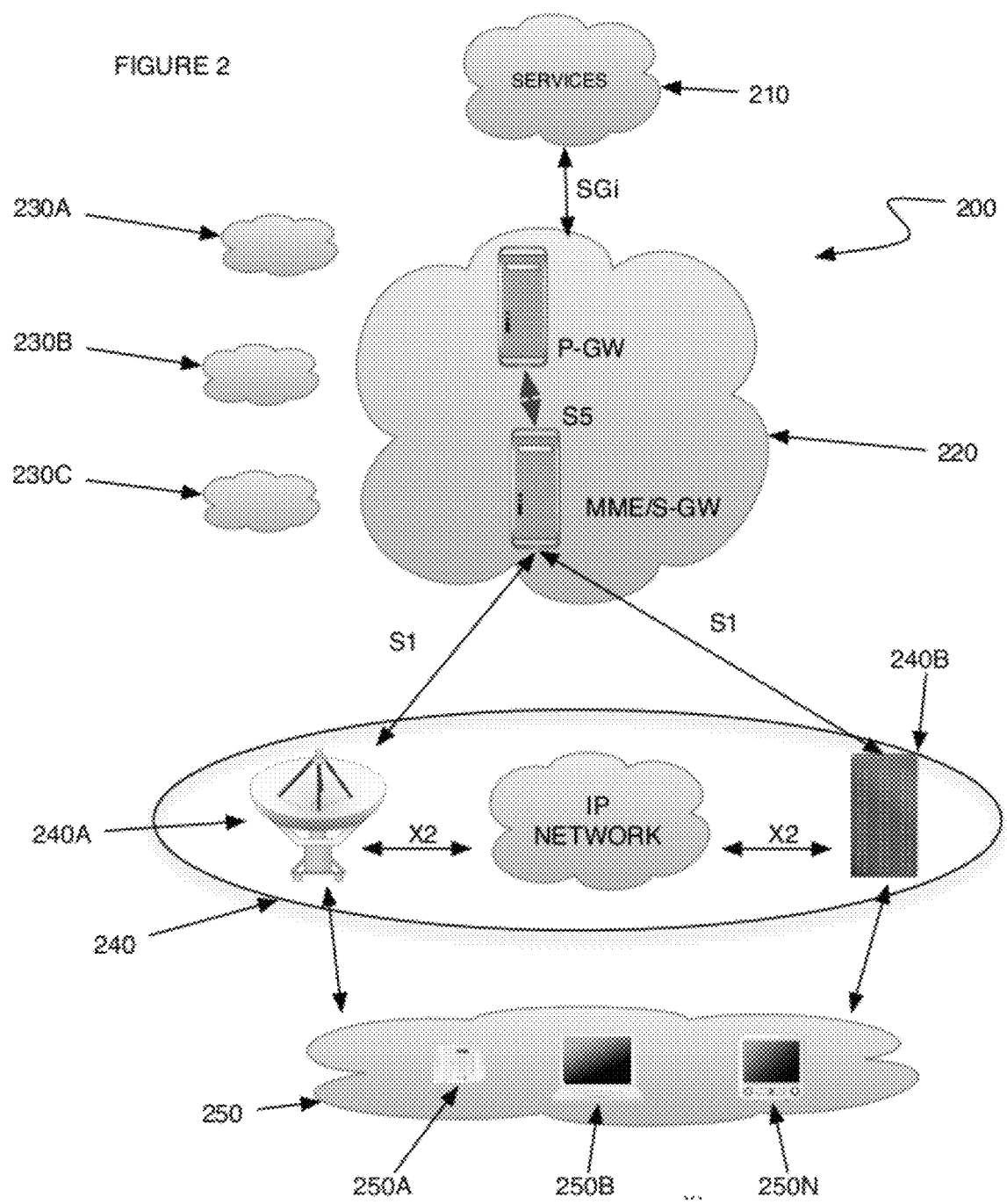
FIG. 2 is a pictorial diagram illustrating an exemplary network configuration suitable for implementing one or more aspects of the disclosed subject matter.

FIG. 2 is a pictorial diagram illustrating a network configuration 200 suitable for implementing one or more aspects of the disclosed subject matter. More specifically, FIG. 2 includes several network layers that provide the airlink connection resources to the plurality of subscriber devices 250A, 250B . . . 250N. It should be noted that the network layers illustrated in FIG. 2 are only exemplary and that the disclosed subject matter equally applies to a network configuration with more or less layers or when one or more illustrated layers are combined. Further, as will be discussed later, servers, nodes, interfaces, and subscriber devices illustrated in FIG. 2 are exemplary and not limiting in number, name, or placement within the network configuration and that the disclosed subject matter equally applies to a network configuration with more or less servers, nodes, or subscriber devices, or with interfaces and protocols not specifically mentioned. Still further, and for the sake of simplifying FIG. 2, only one access network or network of macrocells 240 is illustrated. It should be noted, however, that in operation there may be a plurality of access networks or networks of macrocells within a network configuration like the one illustrated at FIG. 2.

Returning to FIG. 2, network layer 210 houses one or more content servers and other networking devices that provide end user services such as voice, web content, and multi-media content. In other words, network layer 210 houses the content of information. Network layer 210 interfaces with network layer 220 via known interfaces, for example the SGi interface to deliver the content of information. Network layer 220 is the core networking layer. Similar to network layer 220, which is the core networking layer of the wireless network that addresses the deficiencies associated with traditional wireless networks, for example, the 3 GPP LTE wireless network, network layer 230A-320C are core networking layers of traditional wireless networks. For example, network layer 230A could be the core-networking layer for the $1^{st}$ Generation ("1G") wireless network. Similarly, network layer 230B could be the core-networking layer for the 2G wireless network, and network layer 230C the core networking layer for the 3G wireless network. The core network layers of the 1G, 2G, 3G, and 3GPP LTE networks communicate with each other via known protocols (not shown).

Network layer 220 houses one or more servers, for example the P-GW and MME/S-GW class servers for delivering the content from network layer 210. Servers within the core network layer communicate with one or more nodes within the access network layer 240 via known interfaces, for example the S1 interface and between each other via other known interfaces, for example the S5 interface. Access network 240 illustrates two nodes, namely, node 240A that is an eNodeB and node 240B that is another eNodeB. Nodes 240A and 240B are interconnected with each other via known interfaces, for example the X2 interface. Access network 240 comprises a plurality of access nodes ("smaller cells") within its coverage boundary. These smaller cells range in a coverage area spanning from 600 meters for microcells to about 200 meters for picocells to about 60 meters for femtocells. As noted, each of these smaller cells offers the same bandwidth of wireless airlink connection to the subscriber devices available from just the macrocells in the traditional wireless networks.

Finally, network layer 250 houses the plurality of subscriber devices 250A, 250B . . . 250N. As noted, subscriber devices include, but are not limited to cellular telephones, desktop and laptop personal computers, PDAs, and other devices that use wireless technology. Subscriber devices 250A, 250B . . . 250N can request content information from the network layer 210 or from the network layers of the traditional networks (not shown) that house services specific to that network. When subscriber devices 250A, 250B . . . 250N request content from network layer 210, nodes 240A or 240B are the nodes that would service that request. Similarly, when the subscriber devices 250A, 250B . . . 250N request content from the network layer of traditional wireless networks that house services specific to that network, nodes 240A or 240B are the nodes that would service that request using known interfaces (not shown).

As noted, there is a plurality of smaller cells within the coverage boundary of a macrocell. According to one embodiment, these smaller cells are dynamically created to load balance the bandwidth of airlink connection resources available using an extemporaneous and an "as needed" deployment methodology. Each of these smaller cells offers the same bandwidth of airlink connection to subscriber devices available from just the macrocells in the traditional wireless networks.

Figure 3:
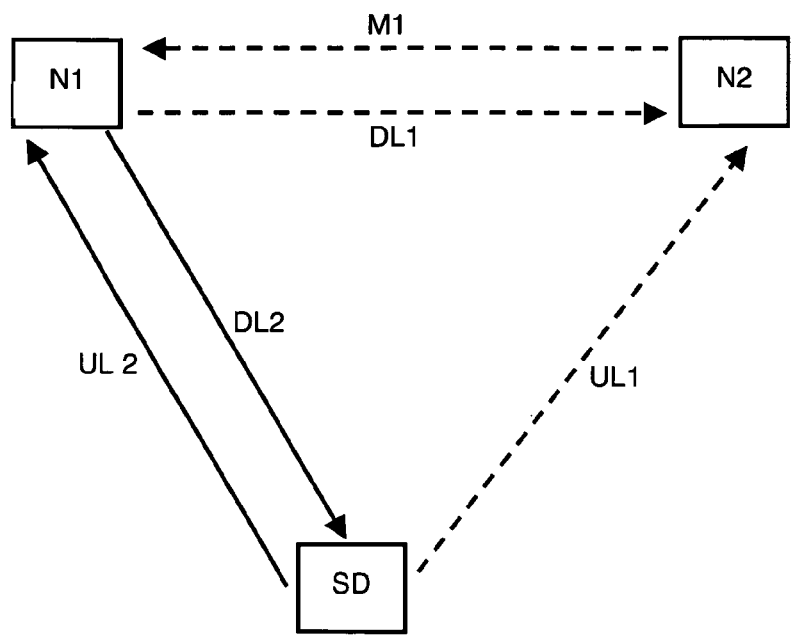
FIG. 3 is a pictorial diagram of an exemplary handover using the "pull" schema, according to one embodiment of the disclosed subject matter.

FIG. 3 is a pictorial diagram of an exemplary handover using the "pull" schema, according to one embodiment of the disclosed subject matter. N1 and N2 are two exemplary eNodeBs with overlapping coverage areas and SD is an exemplary subscriber device within a plurality of subscriber devices (not shown). SD currently gets its services from eNodeB N1. Accordingly, eNodeB N1 is a "serving" node and eNodeB N2 is a "candidate" node. DL1 is the communications path over which downlink signals are carried between N1 and N2 (optional) and DL2 is the communications path over which downlink signals are carried between N1 and SD. Similarly, UL1 is the communications path over which uplink signals are carried between SD and N2 and UL2 is the communications path over which uplink signals are carried between SD and N1. M1 is the message sent from N2 to N1 if N2 can provide at least a minimum grade of service as required by the wireless network to SD. A minimum grade of service is dictated by the wireless network and may be different for different services. Further, sufficient airlink connection resources must be available before a node can provide the minimum grade of service for a subscriber device. Accordingly, if a serving node is currently providing a grade of service well above the required minimum, the service is handed over to another node even if the other node provides a grade of service less than the serving node as long as the grade of service provided by the other node is more than the minimum required.

As noted, nodes, i.e., candidate nodes may continuously scan for signals transmitted by subscriber devices actively connected to other nodes for handover of services of a subscriber device. Accordingly, in operation, candidate node N2 continuously scans or "pulls" information of services from subscriber devices including SD for handover of services from serving node N1. Uplink signals sent from SD to N1 are received at N2 via uplink communications path, UL1. N2 processes, or measures, these signals to determine current resource needs of SD.

Candidate nodes may also continuously scan for signals transmitted by serving nodes actively connected to subscriber devices for handover of services of a subscriber device. Accordingly, in operation, candidate node N2 continuously scans or "pulls" information of services from serving nodes including N1 for handover of services from the serving nodes. Downlink signals sent from N1 to SD are also received at N2 via downlink communications path, DL1. In this case, N2 is equipped with a receiver that allows it to receive and process, or measure, these signals to determine current resource needs of SD.

If a measurement taken from either the uplink signals or downlink signals leads to the conclusion that N2 is able to provide the at least minimum grade of service to SD, N2 sends message M1 to serving node N1 informing N1 of the conclusion. If N1 asserts that the conclusion is in fact true, N1 hands over services of SD to N2. N2 then continues as the new serving node by providing uninterrupted services to SD without SD's involvement in the handover of services from N1 to N2.

Figure 4:
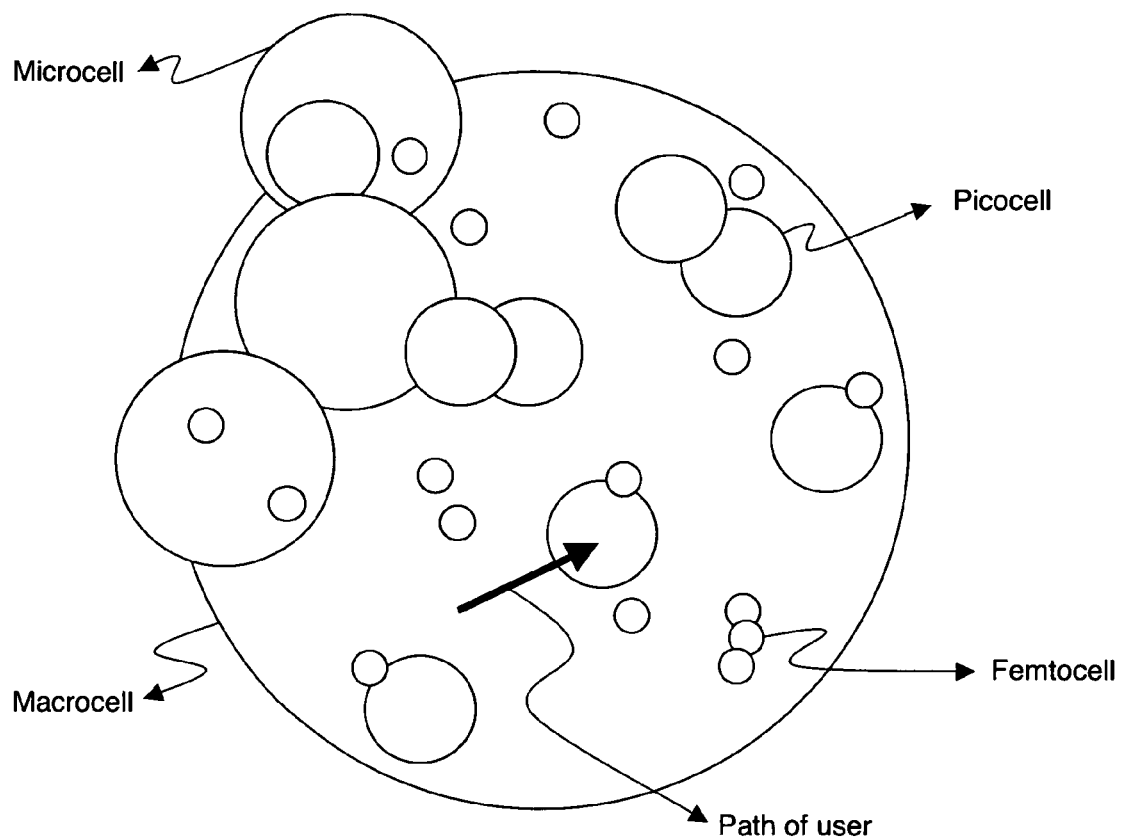
FIG. 4 is a pictorial diagram of a plurality of exemplary smaller cells within the coverage boundary of an exemplary macrocell, according to one embodiment of the disclosed subject matter.

FIG. 4 is a pictorial diagram of a plurality of exemplary smaller cells within the coverage boundary of an exemplary macrocell, according to one embodiment of the disclosed subject matter. The plurality of smaller cells comprises of microcells that have a coverage range typically spanning about 600 meters, picocells that have a coverage range spanning about 200 meters, and femtocells that have a coverage range spanning about 60 meters. It should be noted that the number and placement of the smaller cells within the larger macrocell illustrated is only exemplary and should not be taken as limiting. Accordingly, a macrocell can have more or fewer smaller cells depending on the number of subscriber devices and their needs. For example, dense urban areas will have a mixture of cells of various sizes without regard for traditional radio frequency ("RF") concerns such as planned RF channels and power levels. Also capacity needs will target hotspots such as train stations and enterprises. Accordingly, coverage areas will be irregular with a high degree of overlap in some areas. Further, it is desired that if a subscriber device is in the coverage area of a smaller cell then that cell is used to provide service to the subscriber device, while the capacity of the larger cells will be reserved to provide service to subscriber devices located in the gap between the smaller cells.

For example, at FIG. 4, the line marked "Path of user" represents the movement of a user who began receiving service from the macrocell and moves into the coverage area of a picocell. An illustration of this behavior is a user who makes a phone call on the street and then walks into a shop with a picocell providing coverage for the shop. When the user initiates the call, resources on the macrocell are allocated for that service from a pool of resources that are designated as being used by the macrocell and communicated to other nodes that are affected by the usage of these resources. As will be discussed later, the picocell receives more resources than it uses, and it is aware of which resources are being used by the macrocell. So, as the user approaches the shop, the picocell receives energy from the user's transmission to the macrocell, and the picocell can therefore make a measurement of the signal strength and quality of the approaching user's transmission with the knowledge that the user is being served by the macrocell. When the user's signal meets some established minimum criteria, e.g. minimum signal level, the picocell communicates with the macrocell that it is receiving the user's signal well and can provide service to the user. The macrocell may request the user's device to check the measurement of the picocell's broadcast channel to ensure that a good connection will be made. If the measurement is acceptable, the macrocell hands the user over to the picocell to continue the service until such time that the user terminates the connection or moves out of the coverage of the picocell and hands back over to the macrocell or some other cell.

As noted, nodes in a 3GPP LTE wireless network are interconnected via the X2 interface. The nodes use the X2 interface to share information regarding their resource usage within a spectrum of airlink connection resources. Each node receives and is capable of processing more resources than used by the cell within which it lays. For example, node 240A within larger cell 240. The unused resources may be in use by other nodes. Since a node has knowledge of the resources being used by the other nodes, it is capable of making a measurement of the other node's resources for a potential handover.

Figure 5:
FIG. 5 is a pictorial diagram illustrating a resource received by a node in an exemplary time domain, according to one embodiment of the disclosed subject matter.
Figure 5:
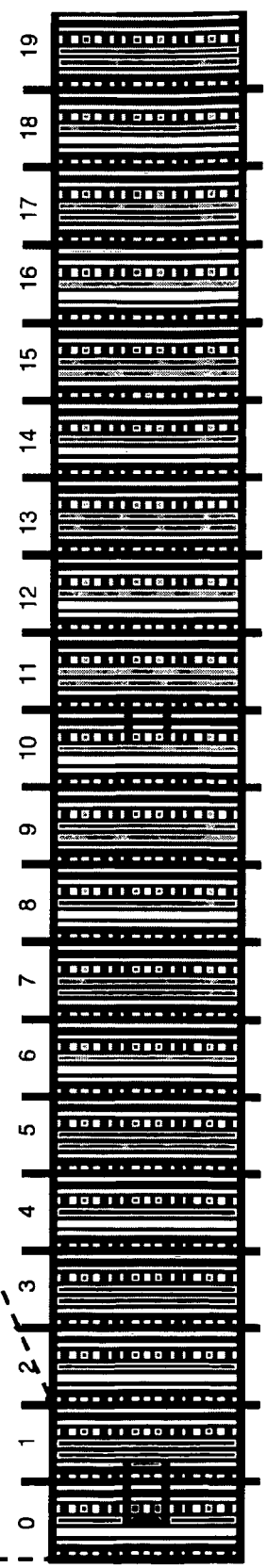

Resources exist in both the time domain and the frequency domain. FIG. 5 is a pictorial diagram illustrating a resource received by a node in an exemplary time domain and frequency domain, according to one embodiment of the disclosed subject matter. The resource is set up in a frame structure whereby different users and different channels are multiplexed using time and frequency as a parameter.

Figure 6:
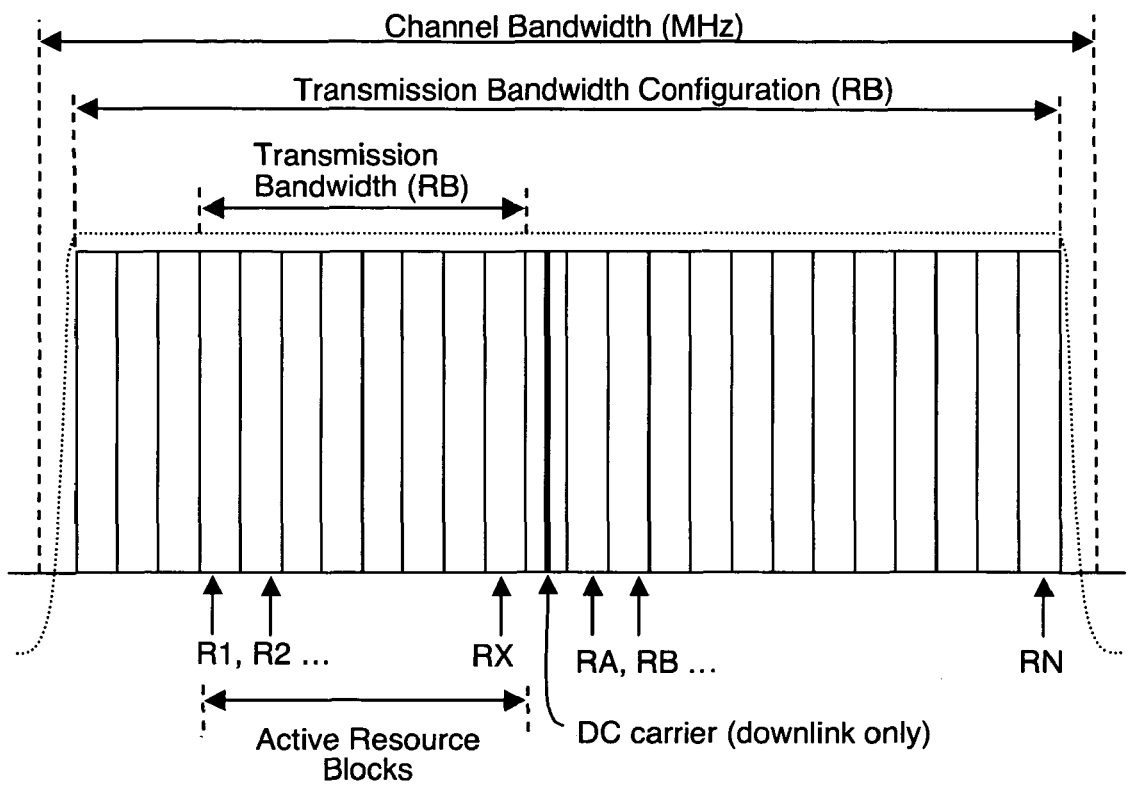
FIG. 6 is a pictorial diagram illustrating a resource received by a node in an exemplary frequency domain, according to one embodiment of the disclosed subject matter.

FIG. 6 is a pictorial diagram illustrating a resource received by a node in an exemplary frequency domain, according to one embodiment of the disclosed subject matter. The frequency band of operation is parceled into smaller chunks called resource blocks. The resource blocks used by the node are marked R1, R2 ... RX. However, the node receives all of the resource blocks within the channel bandwidth including the resource blocks not used by the node marked RA, RB ... RN. It should be noted that even though the resource blocks used by the node, i.e., resource blocks marked R1, R2 ... RX and resource blocks not used by the node, i.e., resource blocks marked RA, RB ... RN are contiguously shown, the resource blocks used by the node can be separated by one or more unused resource block and vice-versa.

The unused resource blocks may not be idle, but could be used by the other nodes within a cell, as the same spectrum is shared amongst the plurality of nodes of the given cell. So, even though the node receives all available resource blocks, the node only uses the ones marked R1, R2 ... RX. There may be several reasons for a node to not use all available resource blocks including, but not limited to too much interference or lack of need to serve the required load. Since the node has knowledge of which resources are being used by the other nodes. i.e., resource blocks marked RA, RB . . . RN, it is capable of making a measurement of the other node's resources and using this measurement to assert handover.

As noted, a handover is the changing of a subscriber device's access connection or airlink connection resources from one node to another. A handover is typically the result of a moving subscriber device that leaves the coverage area of one cell and enters the coverage area of another. At other times, a handover is done by the network to shift traffic from one cell to another if, for instance, one cell is more heavily loaded than another and the subscriber device can receive the required level of service from either. According to aspects of the disclosed subject matter, there exists yet another handover deployment situation. This situation arises when a smaller cell, for example a femtocell, is overlaid by a larger macrocell that uses an air interface access technology different than 3GPP LTE. The different air interface access technology could be, for example, the Global System for Mobile Communications ("GSM") interface or the Universal Mobile Telecommunications System ("UMTS") interface. In any case, the smaller cell must have the capabilities for receiving resources from these other interfaces in addition to receiving resources from the 3GPP LTE air interface. There is an inter-radio access technology ("inter-RAT") function within the core networking layer, for example Network layer 220 at FIG. 2, that facilitates handover and other inter-workings between nodes using the 3GPP LTE air interface technology and other air interface technologies such as GSM or UMTS.

Once a node, i.e., candidate node, has taken a measurement of the other node's resources and asserts that it can provide at least a minimum grade of service as required by the wireless network to a subscriber device than a node currently serving the subscriber device, i.e., serving node, the candidate node informs the serving node that it is capable of providing the at least minimum grade of service as required by the wireless network, i.e., it requests a handover of the subscriber device's services. According to one embodiment, the serving node can request the subscriber device to check if the assertion made by the candidate node is mutually valid. If the measurement is mutually valid, the node currently providing the services to the subscriber device initiates the handover to the candidate node. If the measurement is not mutually valid or if the node requesting the handover is found to be unsuitable, maybe because the subscriber device has moved in the interim to a different location or its needs have changed, the subscriber device continues to receive its resources from the serving node.

FIG. 7 is a functional flow chart 700 of an exemplary scenario where a candidate node requests a handover from a serving node currently providing services to a subscriber device, according to one embodiment of the disclosed subject matter. The functional flowchart 700 starts at block 705 and continues to block 710 where the candidate node continuously scans resources in use by the other nodes within the same or different cell. At block 715, the candidate node makes a measurement of resources of each node within its immediate vicinity. At block 720, the candidate node finds one or more subscriber devices being served by other serving nodes for a potential handover. At block 725, a check is made to see if the candidate node is capable of providing the at least minimum grade of service, i.e., a minimum signal strength or bandwidth, to a subscriber device currently serviced by a serving node. If the candidate node is not capable of providing the at least minimum grade of service (arrow from block 725 marked "NO"), at block 730 the candidate node continues to scan the resources in use by the other nodes. If, on the other hand, the node is capable of providing the at least minimum grade of service (arrow from block 725 marked "YES"), at block 735 the candidate node informs the serving node that it is capable of providing the at least minimum grade of service.

At this juncture, the serving node can request the subscriber device to check the measurement taken by the candidate node requesting the handover. This request is made at block 740. Next, at block 745, the subscriber device checks to see if the assertion by the candidate node is mutually valid. If the assertion is not mutually valid (arrow from block 745 marked "NO"), at block 750 the subscriber device continues to receive its resources from the serving node and the flow stops at block 770. If, on the other hand, the measurement is mutually valid (arrow from block 745 marked "YES"), at block 755 another check is made to see if the candidate node is a suitable node. If the candidate node is not a suitable node (arrow from block 755 marked "NO"), for example if the subscriber device has moved to a new location or if the subscriber device's needs have changed in the interim, the flow continues to block 750 after which the flow stops at block 770. If, on the other hand, the candidate node is a suitable node, at block 760 the serving node initiates the handover to the candidate node. At block 765, the subscriber device gets its resources from the candidate node, which is now the serving node and the flow stops at block 770. Since a node requests handover rather than the subscriber device, which it does by continuously scanning resources in use other nodes, or a "pull" schema, the network successfully addresses the prior art inefficient "push" schema for handover of services of a subscriber device from one node to another.

While illustrative embodiments have been illustrated and described, it will be appreciated that various changes can be made therein without departing from the spirit and scope of the disclosed subject matter. Thus, while preferred embodiments of a network that addresses the unavailability of the finite bandwidth of airlink connection resources and for the network to have nodes that continuously scan resources in use by other nodes for handover incidents using a "pull" schema are described herein, it is to be understood that the embodiments of the disclosed subject matter are not limited to the described network and methods but rather by the following claims and their full scope of equivalents.

The invention claimed is:

1. A method for managing a connection of a subscriber device in a wireless network having a plurality of base stations, the base stations being wireless communication stations that handle traffic and signaling of subscriber devices, the method comprising:

scanning an airlink connection resource in use by a serving base station that is providing a connection to a subscriber device, the scanning being performed by a candidate base station;

determining whether the candidate base station can provide the subscriber device with a minimum grade of service required by the wireless network; and initiating a handover from the serving base station to the candidate base station upon determining that the candidate base station can provide the subscriber device with the minimum grade of service required by the wireless network, wherein the determining step and the initiating step are performed by the candidate base station, and wherein the hand over is completed upon receiving verification from the subscriber device that the candidate base station is suitable for providing the at least minimum grade of service.

2. The method of claim 1, further comprising:

pulling information needed to provide the at least minimum grade of service to the subscriber device from the serving base station by the candidate base station.

3. A wireless communications network, comprising:

a serving base station defining a first coverage boundary;

a candidate base station defining a second coverage boundary that is smaller than the first coverage boundary and provided within the first coverage boundary, wherein the candidate base station is configured to:

scan an airlink connection resource in use by the serving base station that is providing a connection to a subscriber device;

determine whether the candidate base station can provide the subscriber device with a minimum grade of service required by the wireless network; and initiate a handover from the serving base station to the candidate base station upon determining that the candidate base station can provide the subscriber device with the minimum grade of service required by the wireless network, wherein the determining step and the initiating step are performed by the candidate base station, and wherein the hand over is completed upon receiving verification from the subscriber device that the candidate base station is suitable for providing the at least minimum grade of service.

4. The wireless communications network of claim 3, wherein the serving base station is capable of requesting the subscriber device to verify accuracy of the determination of the candidate base station with respect to providing the at least minimum grade of service to the subscriber device.

5. The wireless communications network of claim 3, wherein a plurality of candidate base stations are provided within the first coverage boundary defined by the serving base station.

6. The wireless communications network of claim 5, wherein the candidate base station is to receive a downlink signal from the serving base station and an uplink signal from the subscriber device.

7. The wireless communications network of claim 3, wherein the handover includes allowing the candidate base station to pull information needed to provide the at least minimum grade of service to the subscriber device from the serving base station.

8. A non-transitory computer-usable medium having computer executable instructions stored thereon to perform a computer-implemented method for managing a connection of a subscriber device in a wireless network having a plurality of base stations, the base stations being wireless communication stations that handle traffic and signaling of subscriber devices, the computer-implemented method comprising:

scanning an airlink connection resource in use by a serving base station that is providing a connection to a subscriber device, the scanning being performed by a candidate base station;

determining whether the candidate base station can provide the subscriber device with a minimum grade of service required by the wireless network; and initiating a handover from the serving base station to the candidate base station upon determining that the candidate base station can provide the subscriber device with the minimum grade of service required by the wireless network, wherein the determining step and the initiating step are performed by the candidate base station, and wherein the hand over is completed upon receiving verification from the subscriber device that the candidate base station is suitable for providing the at least minimum grade of service.

9. The non-transitory computer-usable medium of claim 8, wherein the determining step and the initiating step are performed by the candidate base station.

10. The non-transitory computer-usable medium of claim 9, wherein the handover is completed upon receiving verification from the subscriber device that the candidate base station is suitable for providing the at least minimum grade of service.

11. The computer-usable medium of claim 8, wherein the serving base station provides a first coverage boundary and the candidate base station provides a second coverage boundary, the second coverage boundary being substantially smaller than the first coverage boundary and being provided within the first coverage boundary.

12. The method of claim 1, wherein the serving base station provides a first coverage boundary and the candidate base station provides a second coverage boundary, the second coverage boundary being substantially smaller than the first coverage boundary.

13. The method of claim 12, wherein the second coverage boundary is within the first coverage boundary.

14. The method of claim 13, wherein the determining step and the initiating step are performed by the candidate base station.

* * * * *